(12) United States Patent
Kodialam et al.

(10) Patent No.: US 7,124,187 B1
(45) Date of Patent: Oct. 17, 2006

(54) ROUTING OF BANDWIDTH GUARANTEED PATHS WITH RESTORATION IN AN INFORMATION NETWORK

(75) Inventors: Muralidharan S. Kodialam, Marlboro, NJ (US); Tirunell V. Lakshman, Eatontown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 549 days.

(21) Appl. No.: 09/535,206

(22) Filed: Mar. 27, 2000

Related U.S. Application Data

(60) Provisional application No. 60/142,255, filed on Jul. 2, 1999.

(51) Int. Cl.
*G06F 15/173* (2006.01)
*G01R 31/08* (2006.01)

(52) U.S. Cl. .................. 709/226; 709/239; 370/216; 370/225; 370/227; 370/228; 370/238

(58) Field of Classification Search ............... 709/239, 709/226; 370/216, 225, 227, 228, 238
See application file for complete search history.

(56) References Cited

U.S. PATENT DOCUMENTS

| | | | | |
|---|---|---|---|---|
| 5,065,399 A | * | 11/1991 | Hasegawa et al. | 714/4 |
| 5,495,471 A | * | 2/1996 | Chow et al. | 370/221 |
| 5,848,055 A | * | 12/1998 | Fedyk et al. | 370/228 |
| 5,856,981 A | * | 1/1999 | Voelker | 714/712 |
| 6,021,113 A | * | 2/2000 | Doshi et al. | 370/228 |
| 6,678,264 B1 | * | 1/2004 | Gibson | 370/352 |

OTHER PUBLICATIONS

H. Hwang, K. Kim, Y. Choi, S. Ahn, and C. S. Kim, "Virtual Backup Network for Broadband Network Restoration." IEEE. 1998. pp. 1129-1133.*
K. H. Lee, Y. H. Choi, J. Y. Lee and S.B. Lee. "QoS Restoration using a Disjoint Path Group in ATM Networks." IEEE.*
M. Eom, and C. Kim. "A Restoration Mechanism for Virtual Path-Based ATM Networks." IEEE. pp. 1-4.*
W. Gao, S. Chang, and C. Chang. "Design of Self-Healing Algorithm for ATM Networks." IEEE. 1998. pp. 2-7.*
Chao-Ju Hou. "Design of a Fast Restoration Mechanism for Virtual Path-Based ATM Networks." IEEE. 1997. pp. 3c.3.1-3c.3.9.*
R. A. Guerin, A. Orda, and D. Williams. "QoS Routing Mechanism and OSPF Extensions." IEEE.*

* cited by examiner

*Primary Examiner*—David Wiley
*Assistant Examiner*—Alina Boutah

(57) ABSTRACT

Restorable paths in an information network are established in response to arriving traffic requests. Requests are received at a first node of the network for transmission of traffic to a second node of the network, and each request specifies a desired transmission bandwidth for an active and a backup path to be established between the nodes. Potential active links for an active path are identified in response to a given request, and potential backup links to form a backup path for restoring the active path, are also identified in response to the given request. An active and a backup path are then formulated for each given request from among the potential active links and the potential backup links that were identified in response to the given request.

10 Claims, 3 Drawing Sheets

ROUTING OF BANDWIDTH GUARANTEED PATHS WITH RESTORATION IN AN INFORMATION NETWORK

CROSS REFERENCE TO RELATED APPLICATION

This application claims the priority of U.S. Provisional Application 60/142,255 filed Jul. 2, 1999, and entitled "Dynamic Routing of Bandwidth Guaranteed Tunnels with Restoration".

BACKGROUND OF THE INVENTION

1. Field of the Invention

The present invention relates to a technique for establishing transmission paths meeting a guaranteed bandwidth requirement in an information network, with backup or restoration in the event of an active path link failure.

2. Discussion of the Known Art

Emerging trends in backbone and transport networks require network providers to guarantee that backup paths meeting a certain guaranteed bandwidth will be deployed quickly in the event of active path failures.

For example, and without limitation, consider a Multi-Protocol Label Switched (MPLS) application. In MPLS, a data packet is "encapsulated" at an ingress node (e.g., a first network router), and is given an IP header label. The header label is used to forward the packet along a label-switched path (LSP) or "tunnel" to a destination node (e.g., a second network router). The tunnels may be regarded as virtual point-to-point links between two edge nodes (e.g., the first and the second routers) which may actually be separated by a number of links between successive nodes within a given network. See, e.g., L. L. Peterson, et al., Computer Networks, Morgan Kaufmann Publishers (2d ed. 2000), at 277-80.

Restoration mechanisms create backup paths for redirecting traffic in the event of an active path failure. The backup paths typically are set up simultaneously with the active paths. It therefore becomes necessary to define both an active path and a backup path to satisfy each request for a restorable, bandwidth-guaranteed LSP. The known restoration mechanisms operate in a static manner, i.e., sets of active and backup paths are defined under the assumption that future demands are known. This assumption has a drawback in that network resources are used potential future demands that can be routed. Accordingly, there is a need for a restoration mechanism that operates dynamically, wherein an active and an associated backup path are determined for each request as it arrives, and in such a manner as to use available network resources efficiently.

SUMMARY OF THE INVENTION

According to the invention, a method of establishing restorable paths in an information network in response to arriving traffic requests, includes receiving the requests at a first node of the network for transmission of traffic to a second node, wherein a given request specifies a desired transmission bandwidth for an active path and a backup path to be established between the first and the second nodes. Potential active links in the network are identified for an active path in response to a given request, wherein the potential active links each have an available bandwidth at least equal to that specified by the given request. Potential backup links are identified for a backup path to restore the active path, wherein the potential backup links each have an available bandwidth at least equal to the transmission bandwidth specified by the given request. An active and a backup path are formulated for each given request from among the potential active and backup links identified in response to the given request.

DETAILED DESCRIPTION OF THE INVENTION

In the following, bandwidth routing is used toward setting up guaranteed quality of service (QoS) paths in an information network. Network delays and losses may also be part of a provider's service level agreement (SLA), in which case the SLA may be converted into an effective bandwidth requirement with queuing delays and losses restricted primarily to network edges. As used herein, the terms transmission path, LSP, and tunnel are used synonymously.

Online (Dynamic) Routing

Dynamic routing of LSPs should not rely on offline (static) procedures which assume that demands for routing of restorable paths are known a priori, or that any number of existing LSPs can be re-routed to accommodate a new LSP. Rather, using techniques described below, the LSP requests that arrive one-by-one are routed by an on-line procedure that defines both an active path and a backup path for each request, and in such a manner as to optimize network utilization by increasing the number of future demands that may be routed through existing network resources.

Figure 1:
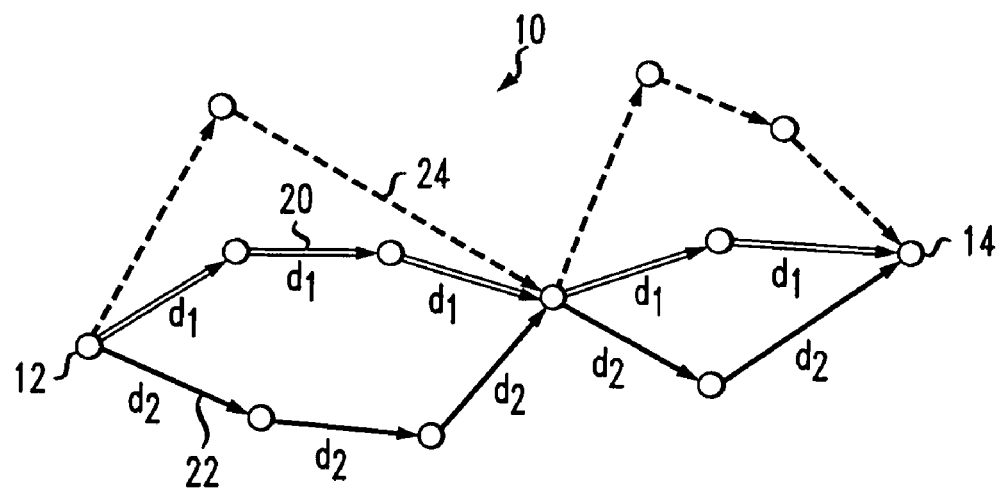
FIG. 1 is a representation of a network in which active and backup paths are defined according to the invention.

Assume that requests for a LSP set-up arrive one at a time at a network 10 in FIG. 1. Each request has an associated ingress node 12, an egress node 14, and a specified bandwidth, e.g., $d_1$ units for request "1", and $d_2$ units for request "2". An active path and a backup path are computed for each LSP request. If sufficient bandwidth is not available to set up either an active path or a backup path, then the request is rejected. For restoration to be feasible, a network link failure should not cause both an active path and a backup path to fail. Thus, an active path and its corresponding backup path cannot share a common link. Protection against only active single link failures is considered, since the backup path will likely be used only a relatively short time while a new active path is being set-up.

Sharing of Backup Paths

For adequate failure protection, when any single link fails in the network, all active connections that traverse the failed link should be switched through backup paths. Because only single link failures are to be protected, two connections having active paths 20, 22 that are completely link disjoint, as in FIG. 1, may share an entire set of backup links that form a single backup path 24. If two active paths are only partially link disjoint, they may still share some backup links. The present procedures exploit the possibility, for more than one active path, of assigning a common backup path or sharing links of different backup paths, so as to reduce the total amount of bandwidth consumed by all paths routed in the network. Significantly, the amount of link sharing that can be achieved in the backup paths is a function of routing information that can be made currently available. Three possibilities are considered, namely, making available (1) no routing information, (2) complete routing information, and (3) only partial routing information.

No Routing Information

Under this scenario, only residual (available) bandwidth on each link is currently known. The residual bandwidth is defined as the difference between the link capacity, and the amount of bandwidth already taken by all active and backup paths traversing the link. This information is obtainable from known routing protocols such as Open Shortest Path First (OSPF) and their extensions. Note, however, that for each link the amount of bandwidth utilized separately by the active and the backup paths is not known. Only total used bandwidth is known. See J. T. Moy, OSPF: Anatomy of an Internet Routing Protocol, Addison Wesley (1998); and R. Guerin, et al., QoS Routing Mechanisms and OSPF Extensions, Proceedings Of Globecom (1997), which are incorporated by reference.

Complete Routing Information

Here, assume that complete routing information is available when routing each new demand for a transmission path. That is, the routes of all active and all backup paths of all connections currently in progress are known. This information is more easily maintained if a centralized routing procedure is employed. If, however, routing computations are to be distributed, it becomes difficult to disseminate this information readily to all network nodes.

Partial Routing Information

Under the third possibility, the information available for routing of each new demand is slightly more than that in the no information scenario, where only total bandwidth usage (or, equivalently, residual bandwidth) for each link is known. Here, the additional information includes the total bandwidth used by the active paths, and, separately, the total bandwidth used by the backup paths. This incremental information is significant, and is capable of dissemination readily to nodes distributed over the network. For example, it is obtainable from known QOSPF protocols provided the backup and the active paths are grouped into separate classes for which associated link bandwidth usage is to be distributed.

Under the first, "no routing information" scenario, it is not possible to share any of the backup paths since relevant information for setting up shared paths, while maintaining restorability against single link failures, is not available. The second, "complete routing information" scenario permits optimal sharing but is not always practical. Hence, it may be used to obtain performance bounds as to how well joint backup routing can be performed. The third, "partial routing information" scenario is relatively modest with respect to the amount of information to be maintained. Because only aggregate information is needed, and per LSP information is not, the information may be used in a distributed fashion. Therefore, joint on-line routing of bandwidth-guaranteed active and backup paths under the partial information scenario is developed further below.

Problem Definition

Consider a network similar to that in FIG. 1 having n nodes (switches or routers) and m links. All links are unidirectional. Requests for a restorable bandwidth-guaranteed LSP set-up arrive either at an ingress router, or at a centralized route server. An explicit route for both an active and a backup path for each request is computed either at the ingress router, or at the route server wherein the paths are distributed to the ingress router for set-up. The actual path set-up is done using a known signaling mechanism such as, without limitation, PNNI in ATM networks, or RSVP/LDP in IP/MPLS networks. Communication between ingress routers and route servers (if any) may be done using known protocols such as COPS and its proposed extensions.

For all the LSPs to be protected against link failures, an active path and a backup path cannot share a common link for any one LSP. Likewise, if LSPs are to be protected against node failures, then an active and a backup path for a given LSP cannot share a common node. When trying to route a request, once it is determined that sufficient bandwidth is not available in the network either to set up an active path or a backup path, the request is then rejected.

As mentioned, LSP requests arrive one at a time. For ease of notation, let b units be a bandwidth demand for a current LSP setup request. Let s denote a source node for the current request, and let d denote a destination node for the current request. If the request is successfully set-up, then all links on the active path will reserve b units of bandwidth for use by this LSP. But all links in the backup path do not necessarily need to reserve b units of bandwidth, because of the mentioned potential sharing of bandwidth in the backup path.

For example, consider two LSPs between nodes s and d, each for b units of bandwidth. Assume the active paths for the two LSPs are routed so they do not share a common link, as in FIG. 1. Because only single link failures are of concern, and a single link failure can cause only one of the two active paths to fail, it is not necessary to consider a possibility wherein both active paths fail simultaneously. Thus, it becomes feasible for both active paths to have a common backup path (as in FIG. 1), and, further, a bandwidth of only b units needs to be reserved for both requests on each link of the common backup path. Note that to determine whether or not the backup path can be shared, complete information indicating the links traversed by the two active paths or, in general, information about the paths of each individual LSP, is needed.

The present routing technique can effectively share backup paths using aggregated information representing only aggregate link occupancy due to active paths, and aggregate link occupancy due to backup paths. Routing procedures based on the case of no current routing information, and on the case of complete current routing information, are used only to determine upper and lower bounds with which to compare performance of the partial information technique.

Let $A_{ij}$ represent the set of active paths that use link (i,j), and let $B_{ij}$ represent the set of backup paths that use link (i,j). Let $F_{ij}$ be the total amount of bandwidth reserved by active paths that use link (i,j). Let $G_{ij}$ represent the total amount of bandwidth reserved by backup paths that use link (i,j). Then, $$F_{ij} = \sum_{k \in A_{ij}} b_k \text{ and } G_{ij} = \sum_{k \in B_{ij}} b_k.$$

As mentioned, $b_k$ specifies the amount of bandwidth required by request k.

Now let $R_{1j}=C_{ij}-F_{ij}-G_{ij}$ represent the residual bandwidth of link (i,j). Since knowledge of any future demands is not currently available, active and backup paths for a current request are then determined so as to optimize the use of network infrastructure, i.e., minimize the amount of total bandwidth used by the active and the backup paths. The amount of sharing that can be realized on a backup path is a function of how much information is known concerning routing of LSPs currently set up in a given network. Thus, the three important scenarios are:

No Sharing (NS): Only $R_{ij}$ is available for link (i,j).

Sharing with Partial Routing Information (SPI): The values of $F_{ij}$ and $G_{ij}$ are known for each link (i,j).

Sharing with Complete Routing Information (SCI): The sets $A_{ij}$ and $B_{ij}$ are known for all links (i,j).

While sharing with partial information (SPI) is of primary interest, the no sharing (NS) and the sharing with complete information (SCI) scenarios are used as bounds for the amount of backup sharing that can be achieved with partial information.

No Sharing (NS)

Assume that at the time of routing a new request, the only information known is the residual capacity $R_{ij}$ for each link (i,j) in a given network. Because a current request is for b units of bandwidth between nodes s and d, and no information is known other than $R_{ij}$, there is no means of determining which active paths can share backup links. Further, even if those backup paths that can be shared are known, there is no means of knowing how much backup traffic is actually being carried by each link. Thus, there is no means to determine how much sharing is possible on each link. Hence, bandwidths of b units must be reserved on each link in the active as well as in the backup paths. Therefore, if $R_{ij}<b$ for link (i,j), then that link cannot be used in an active path or in a backup path for a current request.

Minimizing the total amount of bandwidth consumed in routing a request may be considered analogous to applying a min-hop routing procedure for routing the request without backup restoration. Routing the request with restoration requires the determination of two link-disjoint paths instead of just one path, however. Since the amount of bandwidth consumed on each link is b units, the aim of minimizing the total amount of bandwidth consumed is equivalent to determining a pair of link disjoint paths wherein the total number of links is minimum. This may be considered a typical network flow problem wherein each link has unit cost and unit capacity. There is a supply of two units at node s and a demand of two units are at d. One procedure for solving this problem is given below.

STEP 1: Assume that all links have unit length. Determine the shortest path tree from node s. Let $d_i$ represent the shortest path length from node s to node i. Replace the cost of link (i,j) which is currently 1, with $1-d_j+d_i$.

STEP 2: Let $P_1$ represent a shortest path from s to d. Reverse all the links on $P_1$ and leave the costs as computed in STEP 1. Solve the shortest path problem between nodes s and d on this new graph with the new costs. Let $P_2$ represent this shortest path.

STEP 3: If any of the reversed $P_1$ links belong to $P_2$, eliminate these links from $P_1$ and $P_2$ to form link sets of $P'_1$ and $P'_2$. The set $P'_1 \cup P'_2$ is the set of link disjoint optimal paths.

One of these paths is chosen for an active path for the new demand, and the other path is chosen for a backup path. This scenario (NS) provides an upper bound for the SPI scenario.

Sharing with Complete Routing Information (SCI)

A lower bound on the SPI scenario is obtained by solving the routing problem assuming complete current routing information (SCI) is available. The SCI scenario is developed as an integer programming formulation wherein the sets $A_{ij}$ and $B_{ij}$ are known for all links (i,j). Since robustness under single link failures is assumed, it is possible to share backup paths among demands whose active paths do not share a common link.

Therefore, to formulate the problem, define the quantity $\theta^{uv}_{ij}$ for each link pair (i,j) and (u,v). This quantity $\theta^{uv}_{ij}$ is the cost (e.g., bandwidth usage) of using link (u,v) on a backup path if link (i,j) is used in an active path. To compute the value of $\theta^{uv}_{ij}$, first define the set $\phi^{uv}_{ij}=A_{ij} \cap B_{uv}$. This is the set of demands that use link (i,j) on the active path and link (u,v) on the backup path. Let the sum of all the demand values in the set $\phi^{uv}_{ij}$ be represented by $$\delta^{uv}_{ij} = \sum_{k \in \phi^{uv}_{ij}} b_k$$

and recall that the current demand is for b units of bandwidth between nodes s and d. Now $\theta^{uv}_{ij}$ is defined as follows:

$$\theta^{uv}_{ij} = \begin{cases} 0 & \text{if } \delta^{uv}_{ij}+b \leq G_{uv} \\ & \text{and } (i,j) \neq (u,v) \\ \delta^{uv}_{ij}+b-G_{uv} & \text{if } \delta^{uv}_{ij}+b > G_{uv} \\ & \text{and } R_{uv} \geq \delta^{uv}_{ij}+b-G_{uv} \\ & \text{and } (i,j) \neq (u,v) \\ \infty & \text{Otherwise} \end{cases}$$

The above definition may be explained as follows: Since links (i,j) and (u,v) cannot coincide with both the active and the backup paths, the value of $\theta^{uv}_{ij}$ is set to infinity if (i,j)=(u,v). The quantity $\delta^{uv}_{ij}$ represents the amount of backup capacity on link (u,v) that cannot be used to backup the current demand, if link (i,j) is used in the forward path. This is because $\delta^{uv}_{ij}$ is the amount of bandwidth needed on link (u,v) to backup the active paths currently traversing link (i,j). Therefore, taking the current request into account as well, a total of $\delta^{uv}_{ij}+b$ units of backup bandwidth are needed on link (u,v) if the current request were to traverse link (i,j) and use link (u,v) for backup.

Recall that $G_{uv}$ is the amount of backup (and hence shareable) bandwidth usage currently on link (u,v). Then, the current request can be backed up on link (u,v) without reserving any additional bandwidth if $\delta^{uv}_{ij}+b \leq G_{uv}$. Since only $G_{uv}$ units of bandwidth is shareable, if $\delta^{uv}_{ij}+b>G_{uv}$ then an additional reservation of $\delta^{uv}_{ij}+b-G_{uv}$ units is necessary. If the bandwidth is not available, then this backup path is not feasible so the backup cost of link (u,v) is set to infinity for this request.

Let vector x represent the flow on the active path, where $x_{ij}$ is set to 1 if link (i,j) is used in the active path. Let vector y represent the flow on the backup path, where $y_{ij}$ is set to 1 if link (i,j) is used on the backup path. Routing with full information may then be formulated as the following integer programming problem:

$$\min b \sum_{(i,j) \in E} x_{ij} + \sum_{(i,j) \in E} z_{ij}$$

$$\sum_j x_{ij} - \sum_j x_{ji} = 0 \quad i \neq s, d \quad (1)$$

$$\sum_j x_{sj} - \sum_j x_{js} = 1 \quad (2)$$

$$\sum_j x_{dj} - \sum_j x_{jd} = -1 \quad (3)$$

$$\sum_j y_{ij} - \sum_j y_{ji} = 0 \quad i \neq s, d \quad (4)$$

$$\sum_j y_{sj} - \sum_j y_{js} = 1 \quad (5)$$

$$\sum_j y_{dj} - \sum_j y_{jd} = -1 \quad (6)$$

$$z_{uv} \geq \theta_{ij}^{uv}(x_{ij} + y_{uv} - 1) \quad (7)$$

$$\forall (i,j) \forall (u,v) \quad (8)$$

$$x_{ij}, y_{ij} \in \{0, 1\} \quad (9)$$

$$z_{ij} \geq 0 \quad (10)$$

Equations (1), (2) and (3) above, give the flow balance for the active path. Similarly, equations (4), (5) and (6) give the flow balance for the backup path. Note that the term inside the parentheses in equation (7) is 1 when $x_{ij}$ and $y_{uv}$ are set to 1. In all other cases the term is zero or negative, and, therefore, the constraint is non-binding. Therefore, equation (7) indicates that the amount of bandwidth to be reserved on link (u,v), if it is used on the backup path, is not less than the highest value of $\theta_{ij}^{uv}$ for any link (i,j) on the active path. Since the objective is to minimize the sum of the $z_{uv}$, the value of $z_{uv}$ will in fact be set equal to the highest value of $\theta_{ij}^{uv}$ for any link (i,j) on the active path.

The first term in the objective function only indicates that the amount of bandwidth reserved for the active path is b units for every link on the active path. Note that if the optimal solution is not finite, then there is no feasible solution to the routing problem and the current request is dropped.

An additional constraint $x_{ij}+y_{ij} \leq 1$ may be introduced explicitly to take care of the condition that the active and the backup paths are disjoint. Currently, this condition is implicitly handled by setting $\theta_{ij}^{uv}=\infty$ if (i,j)=(u,v). Since the linear programming relaxation to the explicit formulation of the disjoint paths problem is better than the implicit formula tion, the explicit formulation may be easier to implement, for example, using CPLEX. Problems involving about 80 nodes and 250–300 links were solved using CPLEX in about 10–15 minutes on a low-end workstation. This time is reasonable since the SCI scenario is used primarily only to obtain lower bounds on bandwidth usage.

Sharing with Partial Routing Information (SPI)

Figure 6:
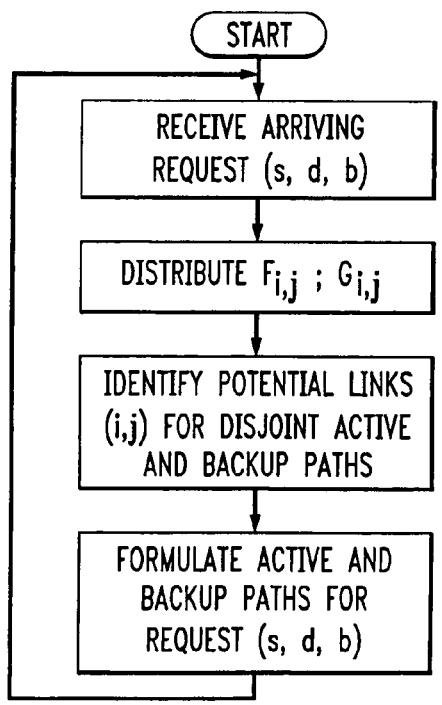
FIG. 6 is a flow chart showing of steps of the present traffic routing method.

Under the SPI scenario, required routing information is obtainable from QOSPF-like protocols, and, hence, SPI is an appealing scenario from a practical viewpoint. In this scenario, information concerning the aggregate bandwidth used on each link by active paths, denoted by $F_{ij}$, and the aggregate bandwidth used on each link by backup paths, denoted by $G_{ij}$, is available. Since only aggregate information on bandwidth usage is of concern, the amount of information maintained in this scenario is independent of the number of LSPs that are currently using the network. That is, while the complete information scenario requires per-LSP information to be maintained, the partial information scenario requires information for only two types of tunnels, viz., active tunnels and backup tunnels. This is only slightly more information than the no information model which keeps track of only the total aggregate bandwidth usage. As shown below, the partial information scenario can realize significant gains in network performance, as measured by the number of rejected requests, by using a relatively small amount of additional information in comparison to the no information scenario. Results very close to the complete information scenario can be obtained. FIG. 6 shows a general flow of the present traffic routing method including steps to: receive an arriving request including s, d, and b information; distribute $F_{i,j}$ and $G_{i,j}$ information; identify potential links (i, j) for disjoint active and backup paths; and formulate active and backup paths for the request including the s, d, and b information. After the formulate step, the routing method then repeats.

First, note that some sharing of the backup paths is possible even though only minimal information is maintained. Let AP represent the active path and BP represent the backup path for a current demand. Assume for the moment that active path AP has been selected already. Let M represent the largest value of $F_{ij}$ for some link (i,j) in the active path, i.e., $$M = \arg\max F_{ij}.$$

$$(i, j) \in AP$$

For a potential link (u,v) on the backup path, if $M+b \leq G_{uv}$, then no additional bandwidth needs to be reserved on the backup path because any link failing on the active path generates a bandwidth need of at most M+b on the links of the backup path. Recall that $G_{uv}$ is the amount of bandwidth in use by backups on link (u,v). If $M+b>G_{uv}$ then, since $G_{uv}$ units of bandwidth are shareable, only an additional reservation of $M+b-G_{uv}$ units is necessary. If this bandwidth is not available, then this backup path is not feasible.

The above sharing notions may be captured in a formulation similar to the full information formulation. For partial information, we set the value of $\theta^{uv}_{ij}$ as follows:

$$\theta^{uv}_{ij} = \begin{cases} 0 & \text{if } F_{ij} + b \leq G_{uv} \\ & \text{and } (i,j) \neq (u,v) \\ F_{ij} + b - G_{uv} & \text{if } F_{ij} + b > G_{uv} \\ & \text{and } R_{uv} \geq F_{ij} + b - G_{uv} \\ & \text{and } (i,j) \neq (u,v) \\ \infty & \text{Otherwise} \end{cases}$$

This is based on the observation that $$\delta^{uv}_{ij} \leq F_{ij} \forall (i,j) \forall (u,v).$$

The integer linear programming problem can be solved with the new values for $\theta^{uv}_{ij}$. A faster procedure for on-line routing for large networks is desirable, however. This is particularly so if the procedure is to run on edge-routers with limited computational resources. Assume that the active path AP has been determined already. Hence, the value of M is known. In this case the cost $b_{uv}$ of using a link (u,v) on the backup path is given by $$b_{uv} = \begin{cases} 0 & \text{if } M + b \leq G_{uv} \\ M + b - G_{uv} & \text{if } M + b > G_{uv} \\ & \text{and } R_{uv} \geq M + b - G_{uv} \\ \infty & \text{Otherwise} \end{cases}$$

A shortest path problem with the cost $b_{uv}$ on link (u,v) can be solved, and this will result in an optimal backup path provided an active path has been independently selected. The amount of sharing possible on a backup path will of course influence the choice of an active path, and so the active path should not be independently chosen at the outset.

Let $\hat{M} = \max(i,j) F_{ij}$, represent a maximum active bandwidth that can be reserved on any link. A high level view for solving SPI is first given below. It assumes there is a subroutine DISJOINT PATH (s, d, f, g) where s and d are two nodes in the network, and f and g are link length vectors. The subroutine DISJOINT PATH ( ), returns the optimal solution to the problem of finding two link disjoint paths between nodes s and d in the network, where the cost of the first path is given by the sum of the $a_{ij}$ for all links (i,j) on the first path and the cost of the second path is given by the sum of $b_{ij}$ for all links (i,j) on the second path. The problem is defined more formally and a solution procedure is given later below. Assuming that DISJOINT PATH ( ) exists, the procedure to solve SPI is the following:

STEP 1: Let M=0. If BEST=∞.

STEP 2: If M>M̂ then exit else compute the cost $a_{ij}$ for using link (i,j) on the active path as $$a_{ij} = \begin{cases} b & \text{if } F_{ij} \leq M \\ \infty & \text{Otherwise} \end{cases}$$

Also compute $b_{ij}$, the cost to use link (i,j) on the backup path as $$b_{ij} = \begin{cases} 0 & \text{if } M + b \leq G_{ij} \\ M + b - G_{ij} & \text{if } M + b > G_{ij} \\ & \text{and } R_{ij} \geq M + b - G_{ij} \\ \infty & \text{Otherwise} \end{cases}$$

STEP 3: Solve DISJOINT PATH (s, d, f, g). If the optimal solution to this problem is OPT and the value of OPT<BEST then set BEST=OPT. Increment M and go to STEP 2.

Therefore, the feasibility of the approach to solving SPI depends on the ability to solve DISJOINT PATH (s, d, f, g). The problem can be stated more formally as follows: Given a directed graph G=(V, E) and two costs $a_{ij}$ and $b_{ij}$ on link (i,j), find a pair of link disjoint paths between a given pair of nodes s and t with minimum total cost, where the cost of the first path is the sum of the ail for all links (i,j) on the first path, and the cost of the second path is the sum of the $b_{ij}$ for all links (i,j) on the second path. This is written in the form of a mathematical programming problem.

$$\min \sum_{(i,j) \in E} a_{ij} x_{ij} + \sum_{(i,j) \in E} b_{ij} y_{ij} \quad (11)$$

$$\sum_j x_{ij} - \sum_j x_{ji} = 0 \quad i \neq s, d \quad (12)$$

$$\sum_j x_{sj} - \sum_j x_{js} = 1 \quad (13)$$

$$\sum_j x_{dj} - \sum_j x_{jd} = -1 \quad (14)$$

$$\sum_j y_{ij} - \sum_j y_{ji} = 0 \quad i \neq s, d \quad (15)$$

$$\sum_j y_{sj} - \sum_j y_{js} = 1 \quad (16)$$

$$\sum_j y_{dj} - \sum_j y_{jd} = -1 \quad (17)$$

$$x_{ij} + y_{ij} \leq 1 \forall (i,j) \in E \quad (18)$$

$$x_{ij}, y_{ij} \in \{0, 1\} \quad (19)$$

In order to obtain lower bounds on the optimal solution value to this problem, first relax the integrality constraints. Next, write the dual to this linear programming problem. Note that when the integral constraints are relaxed, the constraints that $x_{ij}$ and $y_{ij}$ are less than one can be dropped since this is impled by constraints on line (18). Let $\Pi_i$ denote the dual variable associated with the flow balance at node i for the x variables, let $\rho_i$ denote the dual variable associated with the flow balance constraint at node i for the y variables. Let $\sigma_{ij}$ denote the dual associated with constraint (18). The dual then is given by $$\max(\pi_a - \pi_b) + (\rho_a - \rho_b) - \sum_{(i,j) \in E} \sigma_{ij} \qquad (20)$$

$$\pi_i - \pi_j - \sigma_{ij} \geq a_{ij} \forall (i,j) \qquad (21)$$

$$\rho_i - \rho_j - \sigma_{ij} \geq b_{ij} \forall (i,j) \qquad (22)$$

(23)

Any feasible solution to the dual is a lower bound on the optimal primal solution. Assume that some value is fixed for the $\sigma_{ij}$ variables. Then the dual is just two independent shortest path problems. The weight of arc (i,j) for the first shortest path problem is $a_{ij}+\sigma_{ij}$. The weight of arc (i,j) for the second shortest path problem is $b_{ij}+\sigma_{ij}$. The sum of the lengths of the shortest path minus the sum of the $\sigma_{ij}$ is a valid lower bound on the optimal solution to the problem. Note that any feasible solution to the primal problem is an upper bound. The approach used is to generate tight upper and lower bounds to the problem. Note that in the description of the procedure given below, all shortest path problems are solved from node s and the shortest paths are computed to node d. Assume that Dijkstra's algorithm is executed from node s until all nodes are labeled, however. This is needed to facilitate STEP 5 of the procedure. DISJOINT PATH (s, d, a, b), given below:

STEP 1: Set $\sigma_{ij}=0 \forall (i,j)$, set LB=0 and UB=∞.

STEP 2: Solve two shortest path problems the first with weight $a_{ij}+\sigma_{ij}$ on link (i,j), and the second with weight $b_{ij}+\sigma_{ij}$ on link (i,j). Let $P_1$ represent the shortest path with respect to the first set of weights. Let the weight of $P_1$ be $l_1$. Let $h_i$ represent the shortest path distance from node s to node i. Compute the reduced cost $r_{ij}=a_{ij}+\sigma_{ij}-h_j+h_i$ for link (i,j). Note that the reduced cost for the links on the shortest path tree determined by Dijstra's algorithm will be zero. For all links not in the shortest path tree, this reduced cost represents the amount by which the cost on that link can be decreased until it lies in the shortest path tree. Let $P_2$ and $l_2$ represent the shortest path and its length with respect to the second set of weights. Let $e_i$ represent the label for node i after the second shortest path computation. The reduced cost for link (i,j) is given by $s_{ij}=b_{ij}+\sigma_{ij}-ej+ei$. These reduced costs are used in STEP 5. If $l_1+l_2,-\Sigma_{ij}\sigma_{ij}$, is greater than LB, then the value of LB is set to $l_1+l_2,-\Sigma_{ij}\sigma_{ij}$. If LB=UB or if LB and UB are unchanged for 10 iterations then RETURN the value of UB and EXIT.

STEP 3: Temporarily set the value of $\sigma_{ij}=0$ for all links (i,j). Compute the cost of $P_1$ with $a_{ij}$ as the cost of link (i,j). Let the cost of path $P_1$ be represented by $l_1$. Eliminate the link in $P_1$ from the network. Compute the shortest path from s to d in the network with costs of $b_{ij}$ on link (i,j). Let the length of this path be $l'_2$. If $l'_1+l'_2$ is less than the current UB, then the value of UB is set to $l'_1+l'_2$. Repeat the same process first by eliminating the link in $P_2$ from the graph and then determining the shortest path from s to d using costs of $a_{ij}$ on link (i,j).

STEP 4: If $(i,j) \in P_1 \cap P2$, then increment the value of $\sigma_{ij}$ by one.

STEP 5: For each link (i,j), set $\sigma_{ij}=\sigma_{ij}-\min\{r_{ij}, s_{ij}, \sigma_{ij}\}$.

The steps in the above procedure are now explained. STEP 2 and STEP 3 compute valid lower and upper bounds respectively as shown in the dual formulation. STEP 4 attempts to increase the lower bound. Consider the case where the shortest paths after changing the values of $\sigma_{ij}$ in STEP 4 are still given by $P_1$ and $P_2$. Then note that the shortest path length increases by one unit for both the first and the second path, resulting in a unit increase in the lower bound. STEP 5 attempts to increase the lower bound by decreasing the values of $\sigma_{ij}$ while keeping the shortest path lengths the same. Therefore, the value of $\sigma_{ij}$ is reduced on link (i,j) that is not on the shortest path whose reduced cost is positive for both of the shortest path problems.

This procedure executes relatively fast even on large sized networks, and usually obtains solutions within 5% of the optimal solution. Several techniques can be used to speed up the procedure for solving SPI even further. For example, instead of iterating from M=0 to M=$\widehat{M}$, it is sufficient to compute for values of M=$f_{ij}$ for some link (i,j). Therefore, DISJOINT PATH ( ) is called at most m times, where m is the number of links in the network. Of course, if different links have the same $f_{ij}$ values, then the experiment needs to be done only once for all those links. Also note that if the current value of LB is DISJOINT PATH ( ) for a particular value of M is greater than BEST, then the DISJOINT PATH ( ) computation can be stopped. With these enhancements, the procedure for SPI has run in less than a second on a low-end workstation for problems with 70–80 nodes and about 250 links.

To extend the procedure to cover node failures, the representation of nodes is changed by splitting each node into an ingress sub-node where all incoming links terminate, and an egress sub-node where all outgoing links terminate. The two sub-nodes are connected with a link equal to the node capacity, and a failure of this link is equivalent to a node failure. Tunnels which originate at ingress edge-routers should now start at the ingress sub-node corresponding to the ingress router. Similarly, tunnels which terminate at an egress edge-router should now terminate at the egress sub-node corresponding to the egress edge router.

EXAMPLE

Figure 2:
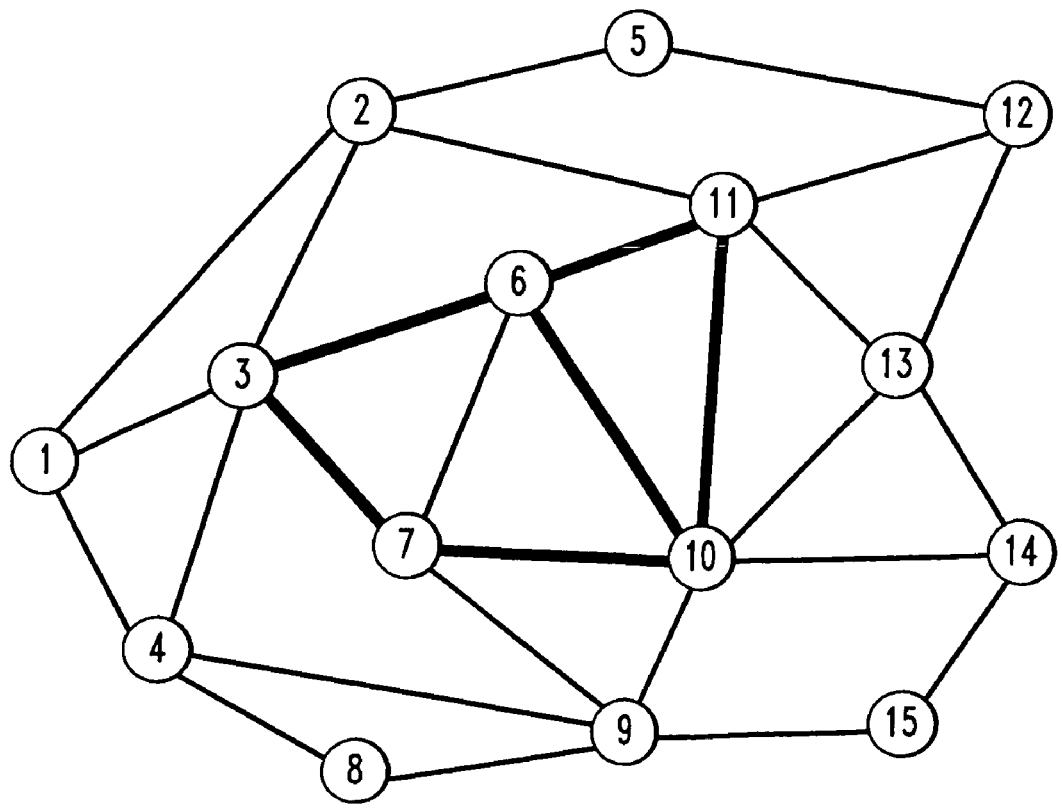
FIG. 2 represents a network that was simulated for the purpose of applying the present technique and obtaining test results.

Experiments were performed using a network graph with 15 nodes and 56 links. The test network is shown in FIG. 2. Each undirected link in FIG. 2 represents two directed links.

Network Loading Experiments

For this set of experiments, the capacities of the links are set to infinity. Requests arrive one at a time to the network. The source and the destination nodes are picked at random from among the nodes in the network. The bandwidth request is uniformly distributed between 1 and 10 units. Each demand has to be allocated an active path and a backup path. Since the capacity is infinite, there is no request rejection. The objective therefore is to compare how well the procedure using partial information performs relative to the no information and the complete information scenarios, in terms of total amount of bandwidth used.

Figure 3:
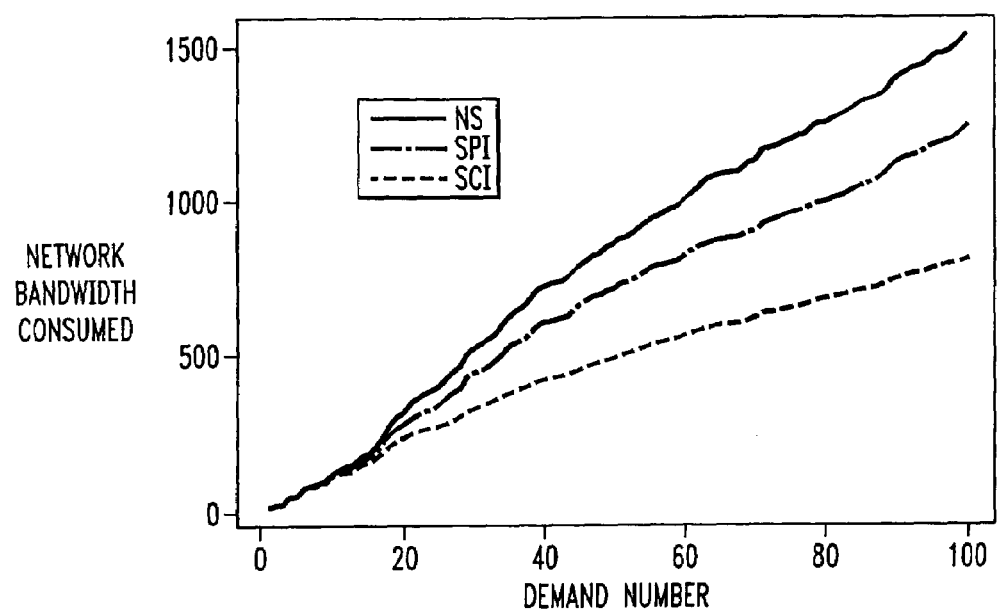
FIG. 3 is a graph representing cumulative network bandwidth usage as a function of a number of set-up traffic demands, under three conditions of backup path sharing according to the invention.

In the NS model there can be no sharing of backup paths. In the SPI and SCI models, there is sharing of the backup paths. The goal is to determine how much bandwidth is saved by this sharing. After 100 demands were loaded onto the network, the total amount of bandwidth consumed by the demands (for both active and backup) was determined for each of the information models. Ten experiments were performed with different random seeds. FIG. 3 shows the performance of the three different models. The saving in total bandwidth between the NS and the SCI modes ranges from about 25% to about 40%. The savings in bandwidth between the NS and the SPI modes is between 15% and 20%. This is significant considering that the SPI mode maintains an order of magnitude less information than the SCI mode. Considerable gains can therefore be obtained by maintaining only a relatively small amount of additional information beyond that needed for the NS mode.

Experiments with Dropped Demands

A second set of experiments were performed to study the behavior of the procedures with respect to the number of demands dropped when there is overloading of the network. In these experiments, the links have finite capacity. The light links in FIG. 2 have a capacity of 12 units in each direction and the dark links in FIG. 2 have a capacity of 48 units in each direction. Requests arrive one at a time. Each request is uniformly distributed between 1 and 10 units. A source and a destination for the demands were picked at random. If there is no capacity for either the active or the backup path, then the demand is assumed to be rejected.

Figure 4:
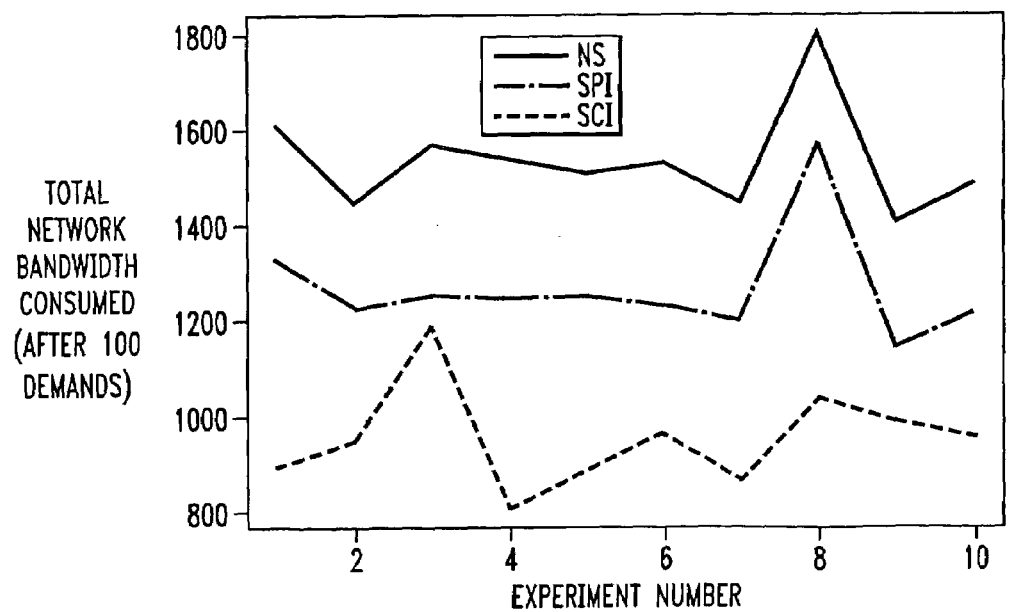
FIG. 4 is a graph representing numbers of rejected traffic requests under the three conditions of backup path sharing.
Figure 5:
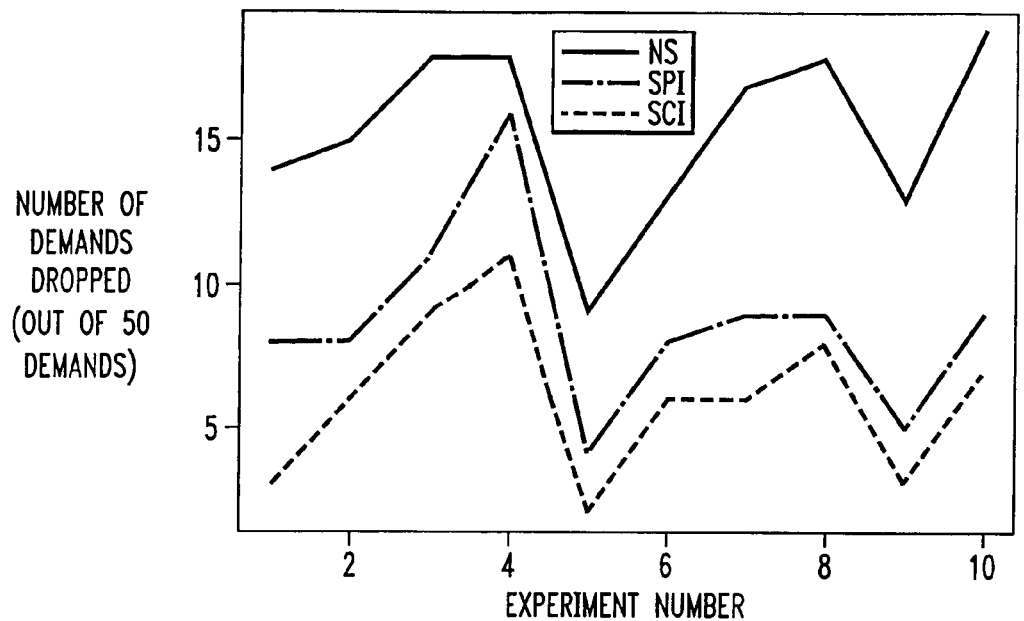
FIG. 5 is a graph representing total network bandwidth usage as a function of successfully routed traffic demands under the three conditions of backup path sharing.

Ten experiments were performed. The number of rejected demands after 50 demands were loaded onto the network, were counted. The results are shown in FIGS. 4 and 5. FIG. 4 gives the number of rejected requests, and FIG. 5 shows the total bandwidth used in each of the ten experiments. Both the SCI and the SPI modes perform better than NS, which is not surprising. It is significant that SPI performs almost as well as SCI in most cases, however. Using the developed procedures, performance gains close to those obtainable with complete information become possible, using a relatively small amount of aggregated information which is easily distributed to ingress nodes for dynamic routing of active and backup paths for arriving traffic demands.

While the foregoing description represents preferred embodiments of the invention, it will be obvious to those skilled in the art that various changes and modifications may be made, without departing from the spirit and scope of the invention pointed out by the following claims.

We claim:

1. A method of dynamically establishing restorable paths in an information network in response to arriving traffic requests, the network having a number of nodes and links between corresponding pairs of nodes, comprising:
   receiving requests at a first node of the network for transmission of traffic to a second node of the network, wherein a given request specifies a desired transmission bandwidth for an active path and a backup path to be established between the first and the second nodes;
   distributing information to nodes in the network concerning (a) total bandwidth reserved by each link in the network for all active paths currently defined in the network, and (b) total bandwidth reserved by each link in the network for all backup paths currently defined in the network;
   identifying potential active links in the network for an active path in response to a given request, wherein the potential active links each have an available bandwidth at least equal to the bandwidth specified by the given request;
   identifying potential backup links in the network for a backup path for restoring the active path after the given request has arrived, wherein the potential backup links each have an available bandwidth at least equal to the desired transmission bandwidth specified by the given request; and
   formulating an active and a backup path for each given request from among the potential active links and the potential backup links identified in response to the given request.

2. The method of claim 1, including determining the available bandwidth of a potential backup link having a certain total bandwidth capacity, by subtracting from the total bandwidth capacity (a) the total bandwidth reserved by the link for all current active paths through the link, and (b) the total bandwidth reserved by the link for all current backup paths through the link.

3. The method of claim 1, including defining each backup path in the network to be link disjoint from its corresponding active path.

4. The method of claim 1, including defining each backup path in the network to be node disjoint from its corresponding active path.

5. A method of dynamically establishing restorable paths in an information network in response to arriving traffic requests, the network having a number of nodes and links between corresponding pairs of nodes, comprising:
   receiving requests at a first node of the network for transmission of traffic to a second node of the network, wherein a given request specifies a desired transmission bandwidth for an active path and a backup path to be established between the first and second nodes;
   selecting active links in the network to form the active path in response to a given request, wherein the active links each have an available bandwidth corresponding to the bandwidth specified by the given request; and
   selecting backup links in the network to form the backup path for restoring the formed active path after the given request has arrived, by using a maximum total bandwidth reservation among the active links selected to form the active path to determine a required bandwidth reservation for each backup link selected to form the backup path.

6. The method of claim 5, including:
   distributing information to nodes in the network relating to (a) total bandwidth reserved by each link in the network for all active paths currently formed in the network, and (b) total bandwidth reserved by each link in the network for all backup paths currently formed in the network.

7. The method of claim 5, including determining if each potential backup link for the backup path to be formed is capable of accommodating the required bandwidth reservation for the active path prior to selecting the potential backup link.

8. The method of claim 7, wherein said determining step includes comparing the total bandwidth reserved by each potential backup link for all current backup paths in the network, with the required bandwidth reservation for the backup path to be formed.

9. The method of claim 5, including defining each backup path in the network to be link disjoint from its corresponding active path.

10. The method of claim 5, including defining each backup path in the network to be node disjoint from its corresponding active path.

* * * * *